(12) United States Patent
Billsberry et al.

(10) Patent No.: US 10,948,585 B1
(45) Date of Patent: Mar. 16, 2021

(54) DUAL BAND RADAR ALTIMETER SYSTEM AND METHOD

(71) Applicant: Rockwell Collins, Inc., Cedar Rapids, IA (US)

(72) Inventors: Mark A. Billsberry, Indialantic, FL (US); Shawn Michael Mason, Satellite Beach, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 161 days.

(21) Appl. No.: 15/946,145

(22) Filed: Apr. 5, 2018

(51) Int. Cl.
*G01S 13/88* (2006.01)
*G01S 7/35* (2006.01)
*G01S 13/26* (2006.01)

(52) U.S. Cl.
CPC .............. *G01S 13/882* (2013.01); *G01S 7/35* (2013.01); *G01S 13/26* (2013.01)

(58) Field of Classification Search
CPC .......... G01S 13/882; G01S 7/35; G01S 13/26; G01S 11/10; G01S 13/10; G01S 13/32; G01S 13/86; G01S 13/878; G01S 13/913; G01S 5/0009; G01S 5/02; G01S 5/0263; G01S 7/28; G01S 13/24; G01S 13/28; G01S 13/348; G01S 13/4427; G01S 7/36; G01S 7/4056
USPC ....................................................... 342/122
See application file for complete search history.

(56) References Cited

U.S. PATENT DOCUMENTS

| | | | | |
|---|---|---|---|---|
| 3,815,132 A * | 6/1974 | Case, Jr. | ............... | G01S 13/935 342/65 |
| 9,075,144 B1 * | 7/2015 | Straub | .................... | G01S 13/882 |
| 9,109,862 B2 * | 8/2015 | Factor | ..................... | F41H 11/02 |
| 2003/0001770 A1 * | 1/2003 | Cornell | ..................... | G01S 7/20 342/26 R |
| 2009/0289834 A1 * | 11/2009 | Devensky | ............... | G01S 13/34 342/122 |
| 2009/0315758 A1 * | 12/2009 | Jirskog | ................... | G01S 7/038 342/124 |
| 2014/0159935 A1 * | 6/2014 | de Graauw | ............... | H04B 1/18 342/21 |
| 2014/0168633 A1 * | 6/2014 | Guetta | ................. | G08B 13/184 356/5.01 |
| 2017/0271764 A1 * | 9/2017 | Gabriel | .................. | H01Q 1/521 |

* cited by examiner

*Primary Examiner* — Peter M Bythrow
*Assistant Examiner* — Alexander L. Syrkin
(74) *Attorney, Agent, or Firm* — Suiter Swantz pc llo

(57) ABSTRACT

An altimeter apparatus for an aircraft includes an altimeter circuit and can use a method of determining altitude. The method includes receiving a first signal in a first band via a first receive antenna, and receiving a second signal in a second band via a second receive antenna. The first band is a C-Band and the second band is at least one of a W-Band, Ku-Band, Ka-Band, V-band, or K-Band. The method also includes providing an altitude in response to the first signal or the second signal.

20 Claims, 5 Drawing Sheets

DUAL BAND RADAR ALTIMETER SYSTEM AND METHOD

BACKGROUND

Embodiments of the inventive concepts disclosed herein relate generally to the field of altimetry. Embodiments of the inventive concepts disclosed herein relate to low range altimeters (LRA) for aircraft and methods of determining altitude.

Altimetry is the technique by which altitude is measured. An altimeter is an instrument that measures altitude. Altimeters are frequently used in avionics where the altitude of an aircraft such as a commercial jet, a helicopter, and/or any other vehicle must be known. In many cases, altimeters can be used in aircraft to notify a pilot of the altitude of an aircraft or to provide altitude data to a warning system or other aircraft equipment. Altimeters may be sonic altimeters, pressure altimeters, or radar altimeters. A conventional radar altimeter, such as a low range altimeter (LRA), uses C-Band radio frequency (RF) waves to determine an altitude above terrain for an aircraft.

SUMMARY

In one aspect, the inventive concepts disclosed herein are directed to a dual range altimeter apparatus. The dual range altimeter apparatus includes an altimeter circuit, a first band transmit antenna for a first band, a second band transmit antenna for a second band, a first band receive antenna physically separate from the first band transmit antenna, and a second band receive antenna. The second band is a higher frequency band than the first band. The altimeter circuit is coupled to the first band receive antenna, the first band transmit antenna, the second band receive antenna, the second band transmit antenna system. The altimeter circuit is configured to provide a first signal in the first band, transmit the first signal via the first band transmit antenna, and receive a second signal via the first band receive antenna. The second signal is a reflected version of the first signal. The altimeter circuit is also configured to provide a third signal in the second band, transmit the third signal via the second band transmit antenna, and receive a fourth signal via the second band receive antenna. The fourth signal is a reflected version of the third signal. The altimeter circuit is also configured to determine an altitude value based on the first signal and the second signal or the third signal and the fourth signal.

In a further aspect, the inventive concepts disclosed herein are directed a method of determining altitude. The method includes receiving a first signal in a first band via a first receive antenna, and receiving a second signal in a second band via a second receive antenna. The first band is a C-Band and the second band is at least one of a W-Band, Ku-Band, Ka-Band, V-band, or K-Band. The method also includes providing an altitude value in response to the first signal or the second signal.

In a further aspect, the inventive concepts disclosed herein are directed a low range altimeter (LRA) apparatus. The LRA apparatus includes a first band RF circuit, a second band RF circuit, and a processor. The processor is configured to receive baseband data from the first band RF circuit and the second band RF circuit and calculate an altitude value in response to the baseband data. The first band is a C-Band and the second band is a higher frequency band than the first band.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
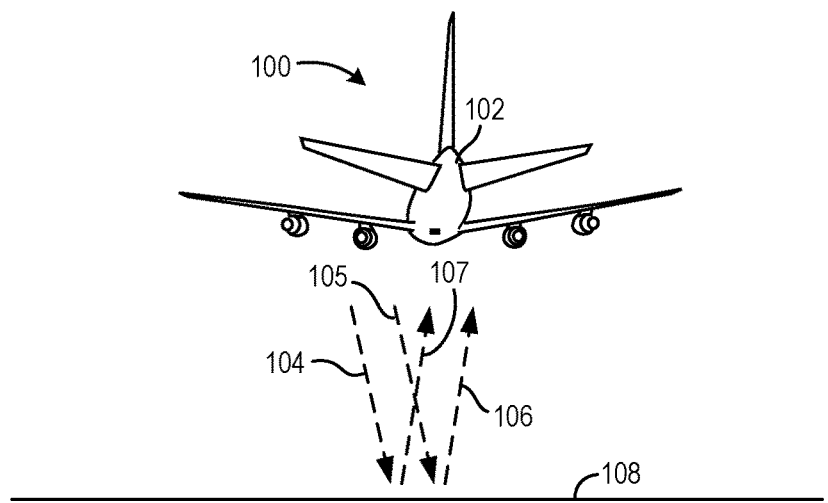
FIG. 1 is a perspective view schematic drawing of an aircraft using a dual-band radar altimeter according to exemplary aspects of the inventive concepts disclosed herein.

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims. The term dual band as used herein should be interpreted to mean two or more bands.

Referring generally to the figures, systems and methods for a low range altimeter (LRA) apparatus are described with respect to various aspects of the inventive concepts. The low range altimeter (LRA), otherwise referred to as a low range radar altimeter (LRRA), can be used in an aircraft to determine the altitude (e.g., height above terrain) of the aircraft, more particularly, the distance between the ground and the LRA in some embodiments. The LRA discussed herein can be used in commercial aircraft, military aircraft, spacecraft, and/or any other vehicle, system, or apparatus where the distance between a surface (e.g., the ground) and the LRA needs to be determined. The LRA transmits a pair of transmit signals via a pair transmit antennas in some embodiments. The transmit signals are reflected by terrain or a surface and are received by a pair of receive antennas. The reflected signals are delayed versions of the transmitted signals. For this reason, the frequency of the received signals trails the frequency of the respective transmitted signals. Circuity of the LRA (e.g., mixers) can be configured to determine the difference (e.g., in frequency in a frequency modulated system) between the transmitted signals and the received signals. Based on the difference, the altitude of the aircraft can be determined.

Conventional LRAs operate in a 4.2 to 4.4 gigahertz (GHz) frequency range and have a 75 decibel (dB) isolation requirement between a single transmit antenna and a single receive antenna at the specified minimal operational performance standards (MOPS). This level of transmit to receive antenna isolation can be very challenging to achieve, especially when the aircraft is landing. In some embodiments, the LRA is a dual band LRA that has improved resolution so that a reduced isolation requirement between the transmit and receive antennas can be used. The reduced isolation requirement (the isolation between a first band (e.g., C-Band) transmit antenna and a first band receive antenna is equal to or less than 30 dB in some embodiments) advantageously enables improved packaging concepts such as a dual combined antenna or a single antenna radar altimeter. In some embodiments, a dual band LRA utilizes C-Band for higher altitudes and a higher frequency band (e.g., X-band, Ku-Band, or W-Band) to provide improved altitude resolution at lower altitudes. In some embodiments, a dual band LRA provides improved altitude resolution/accuracy at low altitudes, improved integrity and availability at low altitudes by providing true dual independent measurements, and/or three dimensional radar imaging using a combination of range, Doppler and angle of arrival processing. In some embodiments, three dimensional radar imaging is achieved using signals from one or more of the higher frequency bands (e.g., the W-Band).

Referring to FIG. 1, an aircraft 100 includes a radar altimeter 102 according to some embodiments. The radar altimeter 102 is an apparatus that includes circuits and circuit components in addition to antennas together in a single enclosure or multiple enclosures in some embodiments. The radar altimeter 102 is a dual band radar altimeter, e.g., a dual band LRA that is configured to determine the altitude of aircraft 100 in some embodiments. The radar altimeter 102 is used in avionics or in other fields where the distance between two objects needs to be determined in some embodiments. The radar altimeter 102 provides a transmit signal 104, and a transmit signal 105 and receives a respective receive signal 106 and receive signal 107. The radar altimeter 102 is configured to use both transmit signals 104 and 105 and receive signals 106 and 107 to determine the altitude of the aircraft 100 in some embodiments.

The transmit signal 104 and the receive signal 106 are provided in the C-Band frequency range (e.g., 4-8 GHz), and the transmit signal 105 and the receive signal 107 are provided in a higher frequency range (e.g., Ku-Band (e.g., 12-18 GHz), Ka-Band (e.g., 26-40 GHz), V-band (e.g., 40-75 GHz), or W-Band (e.g., 75-111 GHz)) in some embodiments. Additional transmit and receive signals can be used. For example, one or more of the listed bands above can be used in addition to the C-Band and the W-Band or other band. The particular bands and the number of bands used are discussed as examples. Other RF frequency ranges and numbers of bands (e.g., a three band radar altimeter) can be utilized.

The aircraft 100 of FIG. 1 is shown to be an airliner. However, the aircraft 100 can be any kind of commercial aircraft, military aircraft, helicopter, unmanned aerial vehicle (UAV), spacecraft, and/or any other kind of vehicle, manned or unmanned. In some embodiments, the aircraft 100 includes a number of altimeters (e.g., dual band radar altimeters 102). For example, aircraft 100 includes three separate radar altimeters 102 in some embodiments. The number of the radar altimeters 102 provides altitude data to a central system that can cross-check the altitude data.

The transmit signal 104 and the received signal 106 can be the same signal, i.e., a signal transmitted by radar altimeter 102 and reflected off of terrain 108. The transmit signal 105 and the received signal 107 can also be the same signal, i.e., a signal transmitted by radar altimeter 102 and reflected off of the terrain 108. The received signal 106 can be a delayed version of transmit signal 104, and the received signal 107 can be a delayed version of transmit signal 105. The received signals 106 and 107 may be a combination of signals with different delays and amplitudes. The signals 104, 105, 106 and 107 are frequency-modulated continuous-wave (FMCW) signals with frequencies in the super high frequency (SHF) band (e.g., frequencies between 3 GHz and 30 GHz). The signals 104 and 106 have frequencies between 4225 MHz and 4375 some embodiments.

Figure 2:
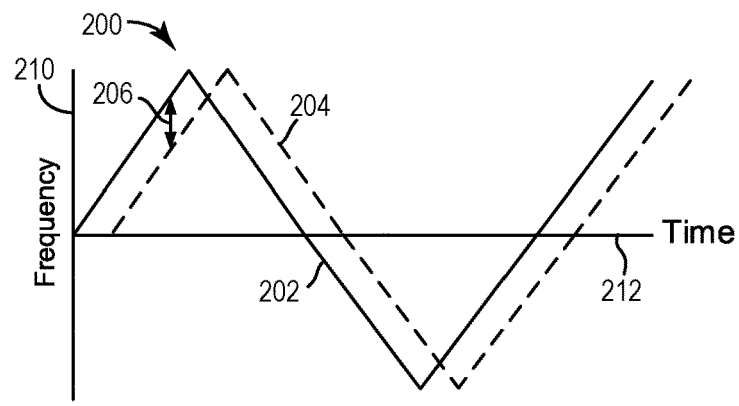
FIG. 2 is a graph of the frequency of transmitted and received signals in a band of the dual-band radar altimeter of FIG. 1, according to exemplary aspects of the inventive concepts disclosed herein.

With reference to FIG. 2, a graph 200 of the frequencies of transmit signal 104 and received signal 106 is shown according to some embodiments. In graph 200, the vertical axis 210, the y-axis, indicates frequency (e.g., frequencies between 4225 MHz and 4375 MHz) while horizontal axis 212, the x-axis, indicates time. A line 202 indicates the frequency of the transmit signal, e.g., the transmit signal 104. A dashed line 204 indicates the frequency of the received signal, e.g., the received signal 106. A difference in frequency between line 202 and dashed line 204, a difference 206, is indicative of the altitude of aircraft 100 in some embodiments. The radar altimeter 102 is configured to determine the difference 206 in frequency between the two signals, e.g., the transmit signal 104 and received signal 106, to determine the altitude of aircraft 100 in some embodiments. The frequencies of the transmit signal 105 and received signal 107 can be distributed similarly to the signals 104 and 106 as shown in FIG. 2 in their respective band or bands and the difference in frequency between the two signals, the transmit signal 105 and received signal 107, is used to determine the altitude of aircraft 100 in some embodiments. For example, the altitude is related to one half of the delay multiplied by the velocity of the RF signals (e.g., signal 104, 105, 106, and/or 107).

The particular frequency pattern of graph 200 is illustrative only. Other frequency patterns can be utilized without departing from the scope of the inventive concepts disclosed herein. Various modulation schemes can be used to determine the time of travel from the emission of the transmit signals 104 and 105 and the receipt of the received signals 106 and 107.

The two altitude values or signals calculated from the signals 104 and 106 and 105 and 107 can be compared, combined or selected to provide a final altitude signal or value. Various criteria can be used to calculate the final altitude, including but not limited to averaging, weighted averaging, historical averaging, or selection of one calculation in response to phase of flight or altitude. In some embodiments, the altitude value calculated using the signals 105 and 107 is selected at lower altitudes or during approach and take-off while the altitude calculated using the signals 104 and 106 is selected at higher altitudes or during cruise.

In some embodiments, the altitude vale is calculated according to a weighted average calculation. In some embodiments, the weighted average calculation is weighted according to one or previously calculated final altitudes. In some embodiments, the following equation or similar equations are used to calculate the altitude value: $FA_t=((1-30,000 \text{ ft}/FA_{t-1})*A1+(30,000 \text{ ft}/FA_{t-1})*A2)/2$ where $FA_t$ equals the final altitude at time t in feet, $FA_{t-1}$ equals the final altitude at time t−1 in feet, A1 equals the altitude calculated using the signals 105 and 107, and A2 equals the altitude calculated using the signals 104 and 106.

The value FA is low pass filtered, Kalman filtered or averaged over time in some embodiments. In some embodiments, the values for A1 and A2 are qualified in accordance with changes over time or other thresholds. If an error is detected in a current value of A1 or A2, the value is discarded and the other value is utilized as FA or a previous value (e.g., very recent) of A1 or A2 is utilized in the weighted average calculation in some embodiments. In some embodiments, if the values of A1 and A2 differ from each other significantly, an error is detected and the A1 or A2 value consistent with other sensor values or historical values is chosen.

Figure 3:
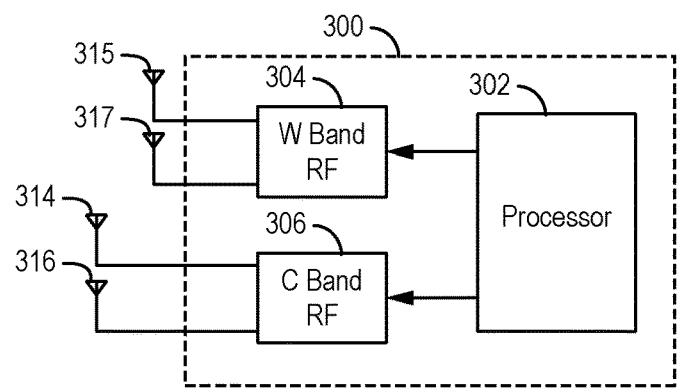
FIG. 3 is a block diagram of a dual-band radar altimeter for use in the aircraft of FIG. 1 according to exemplary aspects of the inventive concepts disclosed herein.

With reference to FIG. 3, a dual band LAR 300 can be used as the radar altimeter 102 of FIG. 1. The LRA 300 includes an altimeter circuit 301, transmit antennas 314 and 315 and receive antennas 316 and 317. The transmit antennas 314 and 315 can be part of an integrated patch antenna system, and the receive antennas 316 and 317 can be part of an integrated patch antenna system in some embodiments. The antennas 316 and 317 are configured for W-Band operation in some embodiments. The antennas 314 and 315 are configured for C-Band operation in some embodiments.

The altimeter circuit 301 and the transmit antennas 314 and 315 generate and transmit a pair of FMCW signals and the altimeter circuit 301 and the receive antennas 316 and 317 receive respective reflections of the transmit signals. In some embodiments, the altimeter circuit 301 includes a processor 302, a C-Band RF circuit 306, and a W-Band RF circuit 304. The altimeter circuit 301 can include various processing circuits, filters, circulators, RF coupler circuits, RF mixer circuits, RF amplifier circuits, RF antennas, voltage controlled oscillators (VCOs), frequency tripler circuits, direct digital synthesizers (DDSs), and/or any other circuit (e.g., application specific integrated circuit (ASCI)), logic circuit, processor, microprocessor, and/or memory component (e.g., random access memory (RAM), read only memory (ROM), hard drive, or other non-transitory or transitory storage mediums).

The processor 302 include a one or more processing circuits (e.g., a signal processors, general purpose processors and memory) that can be configured (e.g., via software) to calculate altitude in response to baseband signals or data received from the W-Band RF circuit 304 and the C-Band RF circuit 306 as well as perform some and/or all of the functions of the LRA 300 described herein. The processor 302 calculates an altitude value in response to the baseband data from the W-Band RF circuit 304 and the C-Band RF circuit 306. In some embodiments, the processor 302 calculates an altitude value in response to the baseband data from the W-Band RF circuit 304 and the C-Band RF circuit 306 and phase of flight information from a flight management computer (FMC) or other aviation equipment. In some embodiments, the processor 302 calculates an altitude value in response to the baseband data from the W-Band RF circuit 304 and the C-Band RF circuit 306 and other data from other altitude sensors.

In some embodiments, the W-Band RF circuit 304 uses hardware and software associated with automotive distance sensing solutions. Advantageously, the W-Band RF circuit 304 leverages the W-Band radar solutions provided in small low power packages. The W-Band RF circuit 304 includes mixers, filters, power amplifiers, and low noise amplifiers configured for W-Band operations. In some embodiments, the W-Band RF circuit 304 is an S-band, K-Band, Ka-Band, or Ku-Band circuit. The W-Band RF circuit 304 can includes a circulator for coupling to the transmit antenna 315 and the receive antenna 317.

In some embodiments, the C-Band RF circuit 306 uses hardware and software to provide baseband signals or data to the processor 302. The C-Band RF circuit 306 includes mixers, filters, power amplifiers, and low noise amplifiers configured for C-Band operations. The C-Band RF circuit 306 includes a circulator for coupling to the transmit antenna 314 and the receive antenna 316 in some embodiments.

In some embodiments, an analog to digital converter (ADC) in the C-Band RF circuit 306 is configured to the sample a down converted difference signal filtered by a low pass filter in the C-Band RF circuit 306 and provide the sampled signal to the processor 302. The down converted difference signal filtered by the low pass filter is derived from the difference between the transmit signal provided to the transmit antenna 314 and the received signal receive by the receive antenna 316. The down converted difference signal in the C-Band RF circuit 306 is a based band signal or data representative of an altitude value provided to the processor 302 in some embodiments.

In some embodiments, an analog to digital converter (ADC) in the W-Band RF circuit 304 is configured to the sample a down converted difference signal filtered by a low pass filter in the W-Band RF circuit 304 and provide the sampled signal to the processor 302. The down converted difference signal filtered by a low pass filter is derived from the difference between the transmit signal provided to the transmit antenna 315 and the received signal received by the receive antenna 317. The down converted difference signal in the W-Band RF circuit 304 is a based band signal or data representative of an altitude value provided to the processor 302 in some embodiments.

In some embodiments, ADCs sample the filtered signals at 625 kHz. Based on the sampled signals, processor 302 determines the altitude based on the difference in frequencies between the transmit signal on the transmit antenna 314 and the received signal on the receive antenna 316 and between the transmit signal on the transmit antenna 315 and the received signal on the receive antenna 317 as indicated by the frequencies of the filtered signals. In some embodiments, the processor 302 selects or combines altitude values or and presents a representation of the altitude of aircraft 100 on a display (e.g., a flight display).

Figure 4:
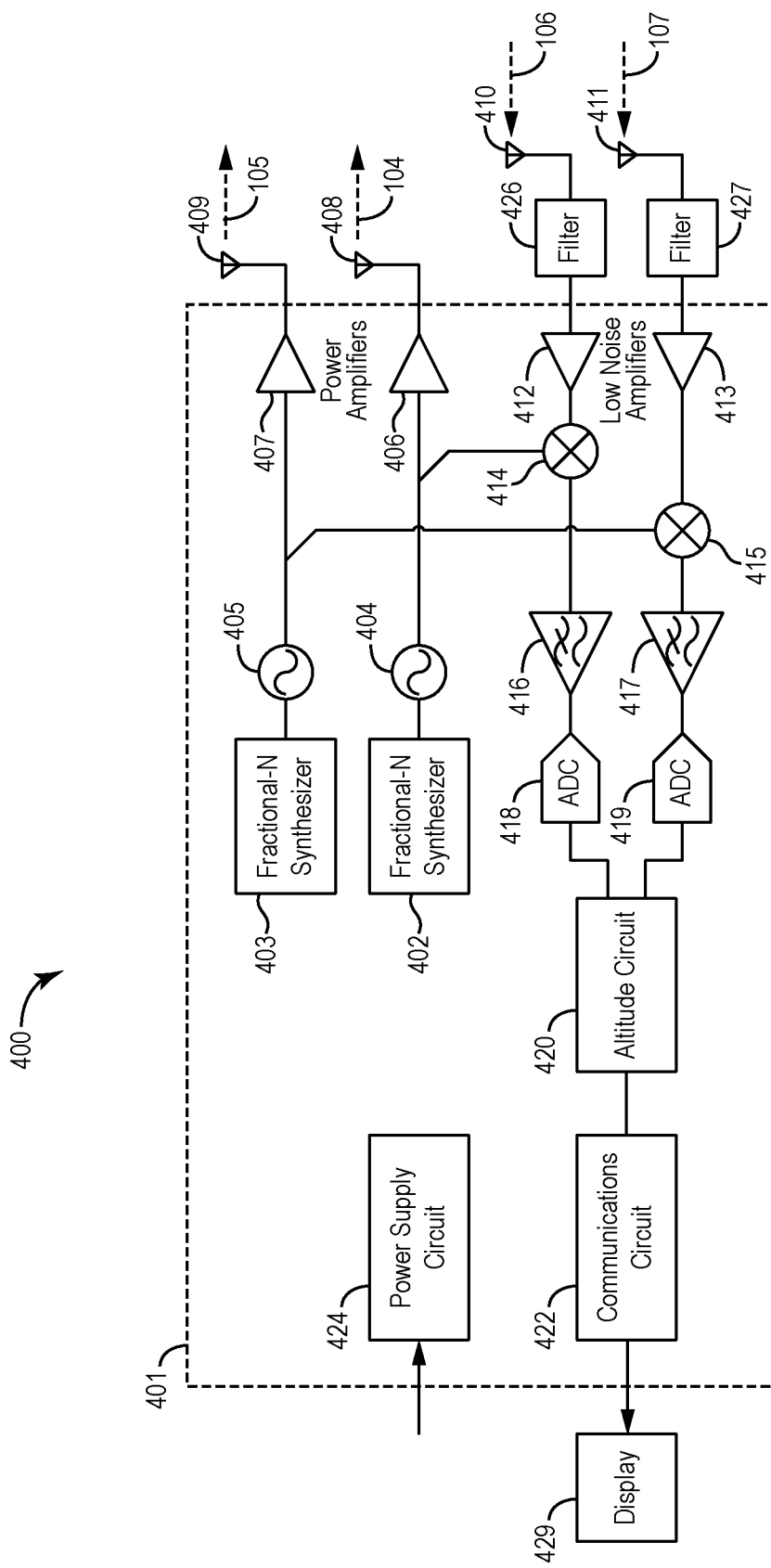
FIG. 4 is a block diagram of a dual-band radar altimeter for use in the aircraft of FIG. 1 according to exemplary aspects of the inventive concepts disclosed herein.

With reference to FIG. 4, a dual band LAR 400 can be used as the radar altimeter 102 of FIG. 1. The dual band LRA 400 is similar to the dual band LRA 300 (FIG. 3) and includes an altimeter circuit 401, transmit antennas 408 and 409 and receive antennas 410 and 411. The altimeter circuit 401 includes transmit side including a C-Band fractional-N synthesizer 402, a W-Band fractional synthesizer 403, a C-Band voltage controlled oscillator (VC) 404, a W-Band VCO 405, a C-Band power amplifier 406, and a W-Band power amplifier 407. The altimeter circuit 401 includes are receive side including a C-Band low noise amplifier (LNA) 412, W-Band LNA 413, a C-Band mixer 414, W-Band mixer 415, a C-Band low pass filter amplifier 416, a W-Band low pass filter amplifier 417, an analog-to-digital converter (ADC) 418, and an ADC 419. The altimeter circuit 401 also includes an altitude circuit 420, a communications circuit 422, a power supply circuit 424, a C-Band filter 426, and a W-Band filter 427.

The antennas 408, 409, 410 and 411 are similar to the antennas 314, 315, 316, and 317 (FIG. 3) and can be part of an antenna system. The antenna system can include one or more antennas that are configured to transmit signals generated by altimeter circuit 401.

The fractional-N synthesizer 402 and/or VCO 404 can be configured to directly generate a FMCW signal in the C-Band which can be amplified by amplifier 406 and transmitted via the transmit antenna 408 as the transmit signal 104. The fractional-N synthesizer 403 and/or VCO 405 can be configured to directly generate a FMCW signal in the W-Band which can be amplified by amplifier 407 and transmitted via the transmit antenna 409 as the transmit signal 105. In some embodiments, the fractional-N synthesizers 402 and 403 are integer-N synthesizers or other indirect digital synthesizer.

The altimeter circuit 401 can include various processing circuits, RF coupler circuits, RF mixer circuits, RF amplifier circuits, RF antennas, voltage controlled oscillators (VCOs), and/or any other circuit (e.g., wired logic circuit, microprocessor, application specific integrated circuit (ASCI)), logic circuit, low power system on a chip (SoC), processor, microprocessor, and/or memory component (e.g., random access memory (RAM), read only memory (ROM), hard drive, or other non-transitory or transitory storage mediums.). The altimeter circuit 401 can include one or more processing circuits (e.g., a processor and memory) that can be configured to perform some and/or all of the functions of LRA 400.

The fractional-N synthesizers 402 and 403 can operate with and/or otherwise drive respective VCOs 404 and 405. For example, VCOs 404 and 405 may generate respective signals at a particular frequency based on voltages received from respective fractional-N synthesizers 402 and 403. In some embodiments, the fractional-N synthesizers 402 and 403 drives the VCOs 404 and 405 causing VCOs 404 and 405 to generate signals that ramp up and down in frequency (e.g., ramps between 4225-4375 MHz in the C-Band and ramps within the W-Band).

The fractional-N synthesizers 402 and 403 each can include VCOs 404 and 405 and/or may be combined with VCOs 404 and 405 as a single integrated circuit. The signal generated by fractional-N synthesizer 402 and/or VCO 404 may be applied as an input to the mixer 414. The signal generated by fractional-N synthesizer 403 and/or VCO 405 can be applied as an input to the mixer 415. In some embodiments, the signals are provided to the mixers 414 and 415 via a coupler. The signals may further be amplified by the respective amplifiers 406 and 407 for transmission on the transmit antennas 408 and 409.

The receive antenna 410 can be configured to receive the reflected signal (e.g. the signal 106), and the receive antenna 411 can be configured to receive the reflected signal (e.g. the signal 107). The LNAs 412 and 413 can be configured to amplify respective received signals 106 and 107. The mixer 414 is configured to mix the signal generated by fractional-N synthesizers 402 and/or VCO 404 and the signal received by antenna 410 and amplified by amplifier 412. The mixer 415 is configured to mix the signal generated by fractional-N synthesizers 403 and/or VCO 405 and the signal received by antenna 411 and amplified by amplifier 413. The result of the multiplication of these signals in the mixers 414 and 415 are a signals that include both the sum and the difference of the frequencies of the respective transmit and receive signals 104, 105, 106, and 107. The low pass filter amplifiers 416 and 417 can be configured to filter the mixed signals and amplify the mixed signals, removing the sum of the frequencies and leaving the difference of the frequencies. The ADCs 418 and 419 can be configured to sample the respective filtered signals (e.g., sampled at 625 kHz) and provide the sampled signals to the altitude circuit 420.

In some embodiments, the altitude circuit 420 is configured to determine the altitude of aircraft 100 based on the sampled signals. The samples provides by the ADCs 418 and 419 are indicative of the difference in frequency between the transmit signal 104 and the received signal 106 and the transmit signal 105 and the receive signal 107 in some embodiments. Based on the differences in frequency, the altitude circuit 420 can be configured to determine the altitude of aircraft 100. In some embodiments, the altitude circuit 420 determines the absolute differences between the frequencies and uses the absolute difference to determine the altitude of aircraft 100. The differences in frequency are indicative of the altitude of aircraft 100 (e.g., the altitude of aircraft 100 is a function of the difference in frequency) in some embodiments. The altitude value can be calculated by a processor within the altitude circuit 420 according to the discussions above in some embodiments.

The altitude determined by the altitude circuit 420 can be transmitted to other systems of aircraft 100. Communications circuit 422 can be configured to act as an interface between the altimeter circuit 401 and other systems of aircraft 100. For example, communications circuit 422 can be configured to communicate the altitude determined by the altitude circuit 420 via a bus such as aeronautical radio Inc. (ARINC) 429. Communications circuit 422 can be configured, in some embodiments, to communicate the determined altitude via a controller area network (CAN) bus, ARINC 429, UART, Ethernet, and/or any other type of communication protocol. The communications circuit 422 is coupled to a display 429 (e.g., a primary flight display computer coupled to a primary flight display) for displaying the altitude value.

The power supply circuit 424 can be configured to receive power from an external power source. In some embodiments, the power supply circuit 424 can be configured to receive AC power and/or DC power from an external power source and power the altimeter circuit 401. In some embodiments, the power supply circuit 424 can include one or more filters, power regulators, rectifiers, or other circuits necessary for powering the LRA 400.

With reference to FIG. 3 and FIG. 4, the antennas 314, 315, 216, and 317 can be located separately from a circuit board that includes LRA 300, and the antennas 408, 409, 410, and antenna 411 can be located separately from a circuit board that includes LRA 400. The LRA 400, however, can be located on a single circuit board along with the antennas 408, 409, 410 and 411 in some embodiments. Since LRA 400 and antennas 408, 409, 410 and 411 can be located on a signal circuit board, the signal circuit board itself can be located outside an aircraft, i.e., connected to the outside of a fuselage of the aircraft.

Figure 5:
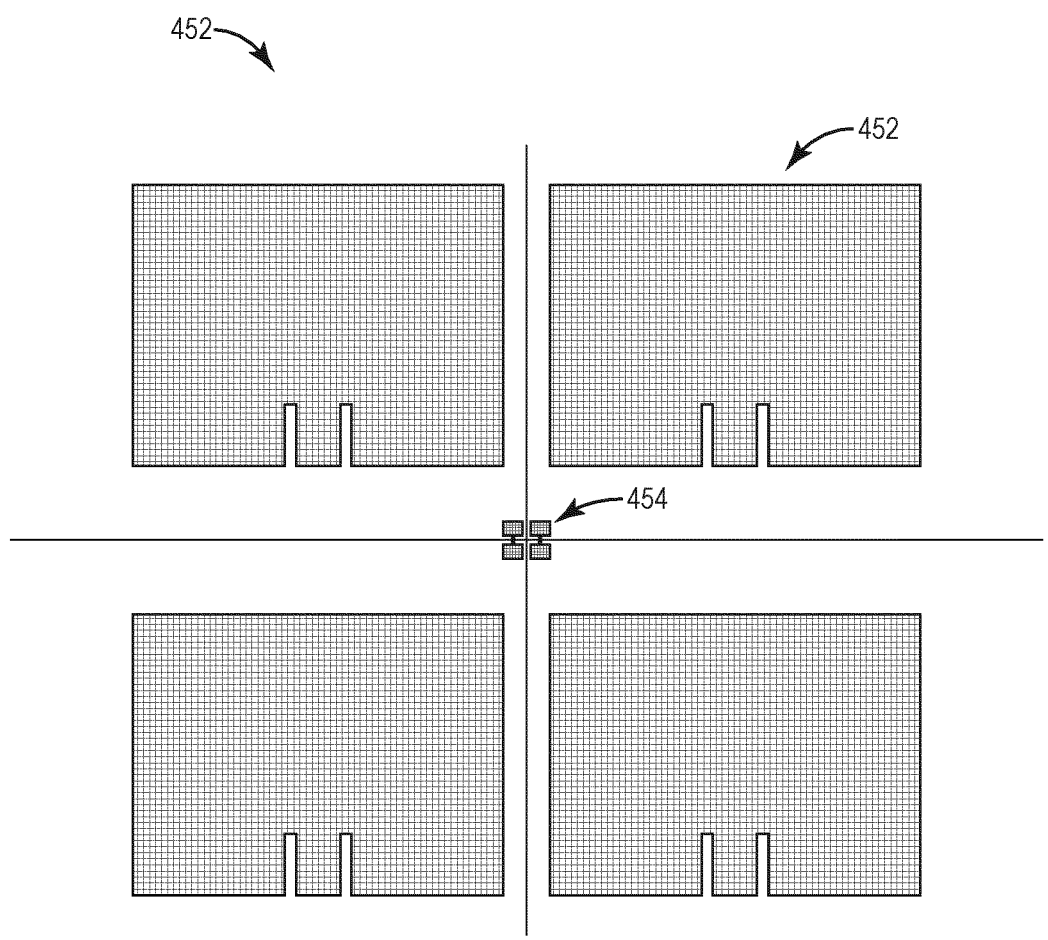
FIG. 5 is a schematic top view drawing of an integrated patch antenna system for the dual-band radar altimeters illustrated in FIGS. 3 and 4 according to exemplary aspects of the inventive concepts disclosed herein.

With reference to FIG. 5, an antenna system 450 is configured as an integrated antenna with W-Band and C-Band elements. The antenna system 450 is a patch antenna system including a four by four array 452 of C-Band elements and a four by four array 454 of W-Band elements. The antenna system 450 can serve as transmit antennas 314 and 315, transmit antennas 408 and 409, receive antennas 316 and 317 (FIG. 3) or receive antennas 410 and 411 (FIG. 4) in some embodiments. The antenna system 450 is provided on a single circuit board in some embodiments.

Figure 6:
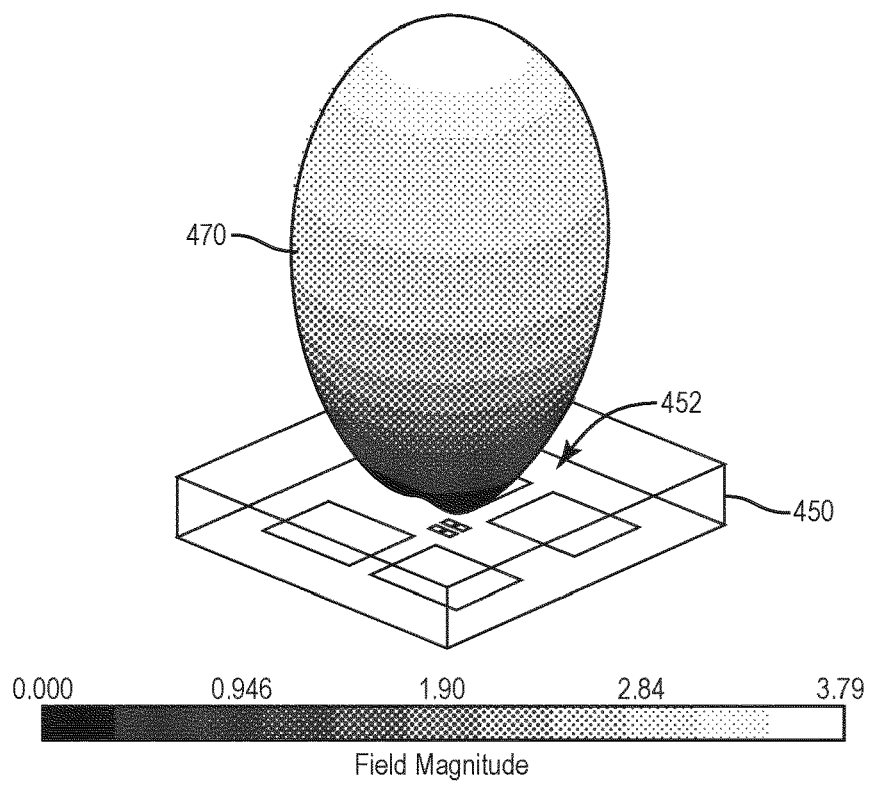
FIG. 6 is a schematic perspective view drawing of the integrated patch antenna system illustrated in FIG. 5 for the dual-band radar altimeters illustrated in FIGS. 3 and 4 showing field magnitude in the C-Band according to exemplary aspects of the inventive concepts disclosed herein.
Figure 7:
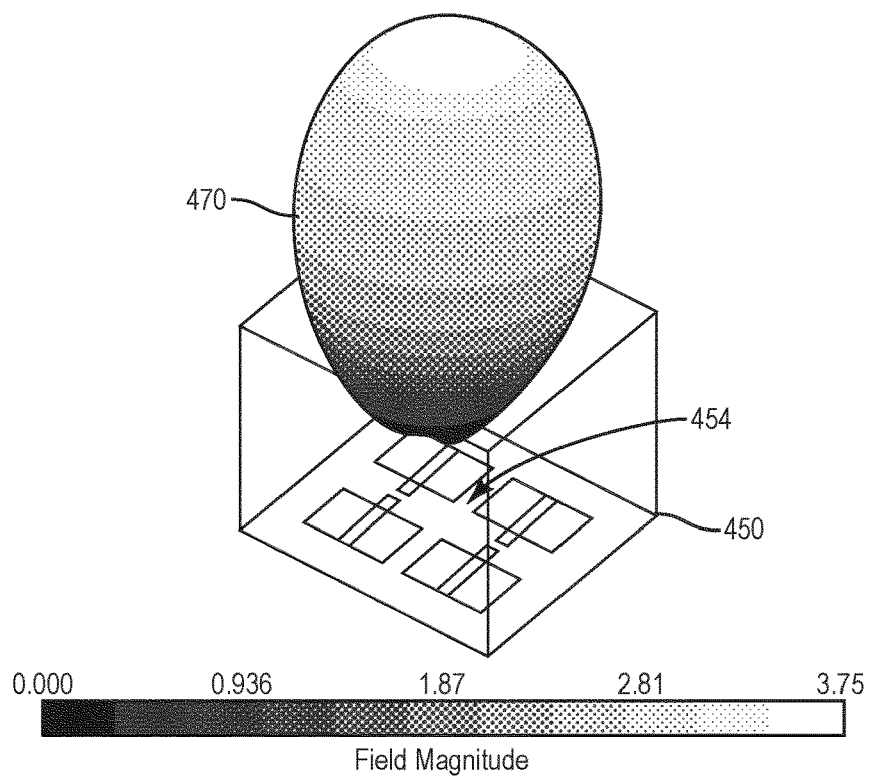
FIG. 7 is a schematic perspective view drawing of the integrated patch antenna system illustrated in FIG. 5 for the dual-band radar altimeters illustrated in FIGS. 3 and 4 showing field magnitude in the W-Band according to exemplary aspects of the inventive concepts disclosed herein.

With reference to FIG. 6, a simulated field magnitude 470 for the four by four array 452 of C-Band elements of the antenna system 450 is shown. With reference to FIG. 7, a simulated field magnitude 472 for the four by four array 454 of the W-Band elements of the antenna system 450 is shown.

Figure 8:
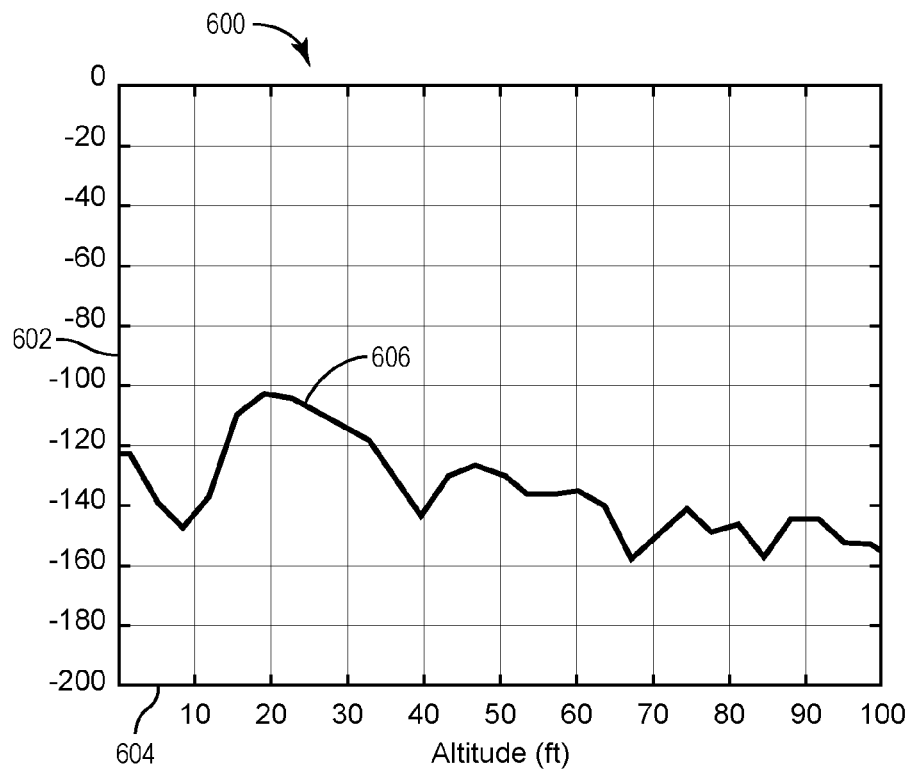
FIG. 8 is a graph illustrating the simulated performance of a single band altimeter with 70 db isolation.

With reference to FIG. 8, a graph 600 illustrates a simulated response (e.g., a line 606) of a C-Band radar altimeter having 75 dB of isolation between the receive antenna and the transmit antenna at an altitude of 20 ft. An X-axis 604 represents altitude and a Y-axis 602 axis represents magnitude of the received signal in Db.

Figure 9:
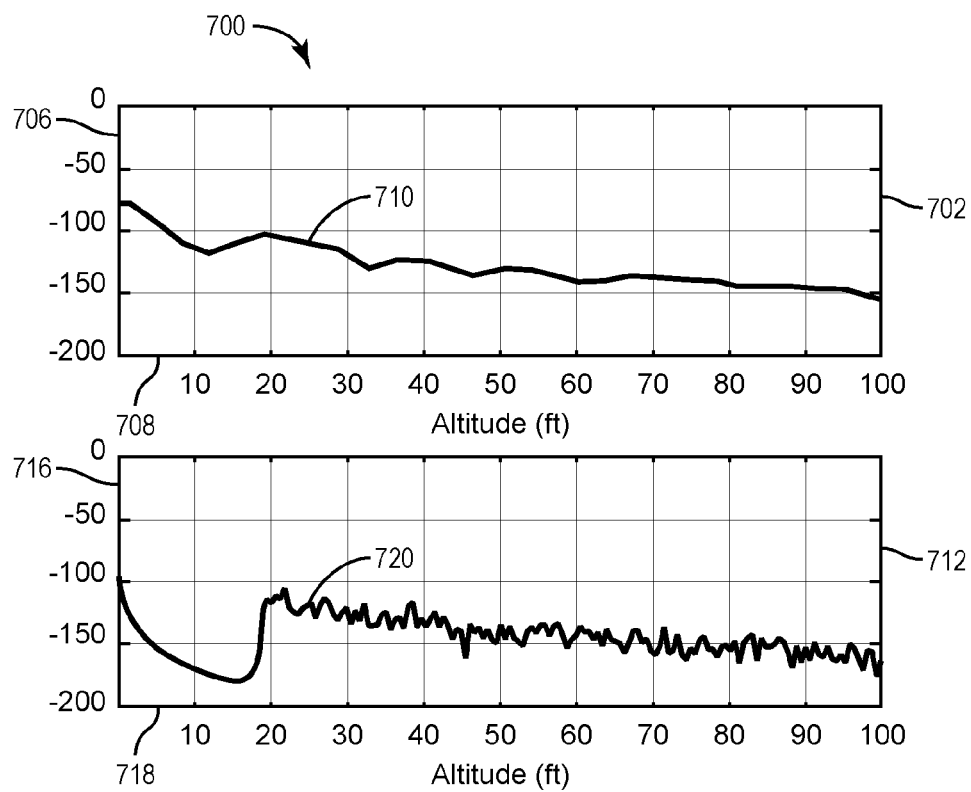
FIG. 9 is a graph illustrating the simulated performance of the dual-band radar altimeters of FIGS. 3 and 4 according to exemplary aspects of the inventive concepts disclosed herein.

With reference to FIG. 9, graph 700 shows first graph 702 first y-axis 706, second graph 712, and second y-axis 716, and x-axis 718. First y-axis 706 and second y-axis represents the magnitude of a C-band response in decibels (dB). Graph a graph 700 illustrates a simulated C-Band response (e.g., a line 710) of a dual band radar altimeter (LRAs 300 or 400) having 30 dB of isolation between the receive antenna and the transmit antenna at an altitude of 20 ft. An X-axis 708 represents altitude and a Y-axis 706 represents magnitude of the received signal in Db. The graph 700 also illustrates a simulated W-Band response (e.g., a line 720) of a dual band radar altimeter having 30 dB of isolation between the receive antenna and the transmit antenna at an altitude of 20 ft. (e.g., using a 1.8 GHz sweep).

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A dual range radar altimeter apparatus, comprising:
a first band transmit antenna for a first band;
a second band transmit antenna for a second band;
a first band receive antenna physically separate from the first band transmit antenna;
a second band receive antenna, the second band being a higher frequency band than the first band;
an altimeter circuit coupled to the first band receive antenna, the first band transmit antenna, the second band receive antenna, and the second band transmit antenna system, wherein the altimeter circuit is configured to:
provide a first signal in the first band and transmit the first signal via the first band transmit antenna;

receive a second signal via the first band receive antenna, wherein the second signal is a reflected version of the first signal;

provide a third signal in the second band and transmit the third signal via the second band transmit antenna;

receive a fourth signal via the second band receive antenna, wherein the fourth signal is a reflected version of the third signal; and determine an altitude value based on the first signal and the second signal or the third signal and the fourth signal by a selection of at least one of averaging, weighted averaging of the first signal and the second signal and historical averaging, wherein the selection is determined in response to phase of flight or altitude.

2. The altimeter apparatus of claim 1, wherein the altimeter circuit is configured to determine the altitude value using both the first signal and the second signal and the third signal and the fourth signal.

3. The altimeter apparatus of claim 1, wherein the altimeter circuit is configured to determine the altitude value using the first signal and the second signal at higher altitudes and determines the altitude value using the third signal and the fourth signal at lower altitudes.

4. The altimeter apparatus of claim 1, wherein the altimeter circuit is deployed on an aircraft and is configured to determine the altitude value using the first signal and the second signal when the aircraft is in a cruise mode.

5. The altimeter apparatus of claim 1, wherein the altimeter circuit determines the altitude value using a weighted average of a first calculation using the first signal and the second signal and a second calculation using the third signal and the fourth signal at lower altitudes.

6. The altimeter apparatus of claim 5, wherein the weighted average is determined based upon an altitude measurement, wherein the first calculation is more heavily weighted at higher altitudes.

7. The altimeter apparatus of claim 6, wherein the first band is a C-Band and the second band is a W-Band.

8. The altimeter apparatus of claim 1, wherein the first band is a C-Band and the second band is at least one of a W-Band, Ku-Band, Ka-Band, V-band, or K-Band.

9. The altimeter apparatus of claim 1, the altimeter circuit is configured to provide three dimensional data for display based upon the fourth signal, the fourth signal being in a W-Band.

10. The altimeter apparatus of claim 1, wherein an isolation between the first transmit antenna and the first receive antenna is equal to or less than 30 dB at 20 feet of height above terrain.

11. The altimeter apparatus of claim 1, wherein the second transmit antenna and the first transmit antenna are integrated in a single package.

12. The altimeter apparatus of claim 1, wherein the first transmit antenna and the first receive antenna are patch array antennas, each comprising four patch antennas.

13. A method of determining altitude comprising:
receiving a first signal in a first band via a first receive antenna;
receiving a second signal in a second band via a second receive antenna, the first band being a C-Band and the second band being at least one of a W-Band, Ku-Band, Ka-Band, V-band, or K-Band; and
providing an altitude value in response to the first signal or the second signal by a selection of at least one of averaging, weighted averaging of the first signal and the second signal and historical averaging, wherein the selection is determined in response to phase of flight or altitude.

14. The method of claim 13, further comprising:
receiving a third signal in a third band via a third receive antenna, the third band being different than the second band and the third band being at least one of the W-Band, Ku-Band, Ka-Band, V-band, or K-Band; and
providing the altitude value at least partially in response to the third signal.

15. The method of claim 13, further comprising:
providing radar imaging using range, Doppler, and angle of arriving processing of the second signal.

16. The method of claim 13, wherein the second signal is used to determine the altitude value when an aircraft is below 10 feet and wherein the first receive antenna, and a corresponding first transmit antenna are provided in a single package.

17. A low range altimeter (LRA) apparatus, comprising:
a first band RF circuit configured for a first band;
a second band RF circuit configured for a second band; and
a processor configured to:
receive baseband data from the first band RF circuit and the second band RF circuit and calculate an altitude value in response to the baseband data, the first band being a C-Band and the second band being a higher frequency band than the first band; and
by a selection of at least one of averaging, weighted averaging of the first signal and the second signal and historical averaging, wherein the selection is determined in response to phase of flight or altitude.

18. The low range altimeter apparatus of claim 17, further comprising:
a first band transmit antenna coupled to the first band RF circuit;
a first band receive antenna coupled to the first band RF circuit, the first band receive antenna being physically separate from the first band transmit antenna;
a second band transmit antenna coupled to the second band RF circuit; and
a second band receive antenna, the second band receive antenna being physically separate from the second band transmit antenna.

19. The low range altimeter apparatus of claim 17, wherein the low range altimeter apparatus is deployed on an aircraft and the first band RF circuit comprises a fractional-N synthesizer, wherein the processor is configured to generate, via the fractional-N synthesizer, a first signal, wherein the first signal generated via the fractional-N synthesizer is a frequency modulated continuous wave (FMCW), wherein based on the fractional-N synthesizer, the first band RF circuit is sized so that the first band RF circuit can be located outside the aircraft.

20. The low range altimeter apparatus of claim 17, wherein the second band is a W-Band.

* * * * *